United States Patent [19]
Johnson et al.

[11] Patent Number: 5,859,935
[45] Date of Patent: Jan. 12, 1999

[54] SOURCE VERIFICATION USING IMAGES

[75] Inventors: Walter A. L. Johnson, Santa Clara; D. Austin Henderson, Jr., Palo Alto, both of Calif.

[73] Assignee: Xerox Corporation, Stamford, Conn.

[21] Appl. No.: 845,649

[22] Filed: Apr. 25, 1997

Related U.S. Application Data

[63] Continuation of Ser. No. 374,408, Jan. 17, 1995, abandoned, which is a continuation of Ser. No. 96,139, Jul. 22, 1993, abandoned.

[51] Int. Cl.$^6$ ................................................ G06K 9/20
[52] U.S. Cl. ............................................ 382/317; 358/403
[58] Field of Search .................................... 382/100, 181, 382/209, 217, 218, 219, 317; 358/400, 401, 402, 403, 404, 405, 448; 235/375

[56] References Cited

U.S. PATENT DOCUMENTS

| | | | |
|---|---|---|---|
| 4,288,782 | 9/1981 | Bader et al. | 340/146 |
| 4,607,387 | 8/1986 | Miyagawa | 382/30 |
| 4,629,873 | 12/1986 | Stockburger et al. | 235/380 |
| 5,060,980 | 10/1991 | Johnson et al. | 283/70 |
| 5,065,447 | 11/1991 | Barnsley et al. | 382/30 |
| 5,084,769 | 1/1992 | Miura | 358/453 |
| 5,099,340 | 3/1992 | Kamada et al. | 358/403 |
| 5,146,512 | 9/1992 | Weideman et al. | 382/30 |
| 5,159,646 | 10/1992 | Kumagai | 382/30 |
| 5,180,153 | 1/1993 | Gegenheimer et al. | 270/53 |
| 5,189,712 | 2/1993 | Kajiwara et al. | 382/30 |
| 5,216,517 | 6/1993 | Kinoshita et al. | 358/403 |
| 5,225,900 | 7/1993 | Wright | 358/75 |
| 5,231,663 | 7/1993 | Earl et al. | 380/18 |
| 5,239,590 | 8/1993 | Yamamoto | 382/4 |
| 5,243,381 | 9/1993 | Hube | 355/204 |
| 5,251,265 | 10/1993 | Döhle et al. | 382/3 |
| 5,255,354 | 10/1993 | Mahoney | 395/133 |
| 5,261,008 | 11/1993 | Yamamoto | 382/4 |
| 5,265,008 | 11/1993 | Benton et al. | 364/408 |
| 5,363,214 | 11/1994 | Johnson | 358/462 |
| 5,448,375 | 9/1995 | Cooper et al. | 358/403 |
| 5,486,686 | 1/1996 | Zdybel, Jr. et al. | 235/375 |
| 5,579,419 | 11/1996 | Yaguchi et al. | 382/305 |
| 5,737,610 | 4/1998 | Sandig et al. | 395/712 |

FOREIGN PATENT DOCUMENTS

| | | | |
|---|---|---|---|
| 506469 | 9/1992 | European Pat. Off. | H04N 1/00 |
| 561606 | 9/1993 | European Pat. Off. | H04N 1/21 |
| 2181875 | 4/1987 | United Kingdom | G06K 9/68 |

OTHER PUBLICATIONS

Using PaperWorks™ on a PC., Xerox Corporation, 1992, pp. 1–4 and 71–86.

Using Paperworks™ from a FAX Machine., Xerox Corporation, 1992, pp. 1–50.

Johnson, W., Jellinek, H., Klotz Jr., L., Rao, R., Card, S., "Bridging the Paper and Electronic Worlds: The Paper User Interface," *Interchi '93 Conference Proceedings*, Apr. 24–29, 1993, pp. 507–512.

(List continued on next page.)

*Primary Examiner*—Andrew W. Johns

[57] ABSTRACT

Original source verifying data defining a first source verifying image are stored in memory. The first source verifying image can be produced by a human making marks by hand in a field of a form, which can then be provided by a scanner or a facsimile transmission through image input circuitry. If a second source verifying image is received that is the same as the first source verifying image, an operation is performed that would not be performed if the images were not the same, such as an operation accessing a related item of data. For example, the first source verifying image can be received with a document image, and data defining the document image and the original source verifying data can be stored so that a source verifying image that is the same as the first source verifying image must be received before an operation can access the document data and provide it to image output circuitry for printing or facsimile transmission. As a result, the marked form is analogous to a key: Only someone who possesses the marked form or a high quality copy can obtain access to the document data. If the marked form is lost or destroyed, the document data cannot be accessed.

21 Claims, 10 Drawing Sheets

OTHER PUBLICATIONS

Huttenlocher, D.P., Klanderman, G.A., and Rucklidge, W.J., "Comparing Images Using the Hausdorff Distance," Cornell University Department of Computer Science, CUCS TR 91–1211 (revised), 1991, pp. 1–35.

Imagio MF350 Model 3 sales brochure, Ricoh K. K., Jan. 1993, four pages, with English translation, pp. 1–27.

Akihiro, O., Patent Abstracts of Japan, Publication No. JP5048649, Feb. 26, 1993.

Huttenlocher, D.P., Rucklidge,W.J., and Klanderman, G.A., "Comparing Images Using the Hausdorff Distance Under Translation," Proceedings of the IEEE Computer Society Conference on Computer Vision and Pattern Recognition Jun. 15–18, 1992, Champaign, Illinois, pp. 654–656.

European Search Report and Annex, Application No. EP 94 30 5293.

SOURCE VERIFICATION USING IMAGES

This application is a continuation of application Ser. No. 08/374,408, filed Jan. 17, 1995, now abandoned which is a continuation of application Ser. No. 08/096,139 filed Jul. 22, 1993, now abandoned.

BACKGROUND OF THE INVENTION

The present invention relates to techniques for verifying the source of a signal, such as a signal requesting an operation.

*Using PaperWorks™ on a PC.*, Xerox Corporation, 1992, pp. 1–4 and 71–121 describes features of PaperWorks ™ software. Page 2 indicates that the software stores a document as an electronic image and that a document from a personal computer (PC) can be delivered to a fax machine, whether a document faxed to the PC or a version of a document created on the PC. Page 3 indicates that a user can set a security code and require that it be entered on forms for PaperWorks to process them. Page 73, near the bottom, shows an image of a window entitled "Marketing Reports" within which an image of a name that had been written on a form is shown for a document sent to a PC from a fax machine. Pages 88 and 116 show forms that include a security section. Page 101 shows how to add a security code request to a form; if a form includes boxes for a security code, PaperWorks processes the form only if the correct code has been marked on it. Page 120 explains that one can require entry of a security code on some or all of one's forms to help keep information on one's PC secure. Page 121 shows steps in setting a security code, including typing a code.

*Using PaperWorks™ from a Fax Machine.*, Xerox Corporation, 1992, also describes features of the Paper-Works™ software. Pages 1 and 4 indicate that information on a PC is secure because one's version of PaperWorks works only with forms created on one's PC; PaperWorks prints a special code on each form so that a document on one's PC can only be accessed with a form from one's PC. Also, for complete security, one can establish a security code to prevent unauthorized use of PaperWorks; that code must be marked on a form before PaperWorks will process it. Pages 5, 15, 32, 35, and 42–43 show forms that include a security section. Page 8 explains that Universal forms are not encoded with a unique PaperWorks ID and can be used with any version of PaperWorks on any PC, but give access only to documents that come with PaperWorks; documents one has stored in PaperWorks or received from others by fax are accessible only with forms encoded with one's unique ID. Page 21 shows a form on which a user can write a name of a document. Page 40 mentions that if a security code is set, PaperWorks processes a starter form only when it's marked with the correct code. Page 41 warns that if the ID of a fax machine one is using is set to a number other than its own number, PaperWorks may send a starter form to a different fax machine, which could give someone unauthorized access to one's PC. Page 42 shows how a PaperWorks security code can be marked on the starter form.

SUMMARY OF THE INVENTION

One aspect of the invention is based on the observation of problems with conventional source verification techniques for data processing systems. Conventionally, a data processing system verifies the source of a signal using a source verifier that includes a set of ASCII codes or other character codes, such as a password.

Conventional techniques for providing ASCII codes or other character codes to a data processing system can be problematic in certain situations. If the codes are obtained directly, such as by pressing keys of a keyboard, the system must have user input circuitry for receiving such codes; in this case, a remote user able to communicate only through a facsimile machine, for example, would have difficulty providing a source verifier. On the other hand, if the codes are obtained indirectly through handprint recognition or other recognition techniques, errors in recognition may make it difficult to provide a source verifier accurately. Such errors could occur because of inadequate recognition software or because of inadequate resolution of the facsimile transmission.

Even if a user is able to provide a set of ASCII codes or other character codes as a source verifier, the level of certainty that can be obtained with such codes is limited. It is possible for unauthorized users to observe or discover the set of codes and use them to obtain unauthorized machine operations.

This aspect is based on the discovery of a technique that alleviates these problems by enabling a user to provide a source verifying image. The first time the user provides the source verifying image, it can be stored as an original source verifying image. When the user subsequently provides the same source verifying image, it can be compared with the previously stored original source verifying image and, because it is the same, an appropriate operation can be performed that would not be performed if the images were not the same.

This technique could be implemented, for example, with a machine that can store and receive data defining images. The machine could store in memory original source verifying data defining a first source verifying image. The machine could use the original source verifying data to verify source. For example, upon receiving data defining an image that includes a second source verifying image, the machine could use the data and the original source verifying data to obtain data indicating a measure of similarity between the two images. The machine could then apply a criterion, such as a threshold, to the measure of similarity to obtain data indicating whether the second source verifying image is the same as the first source verifying image. If so, the machine could perform the appropriate operation.

A user could produce a source verifying image, for example, by marking a field of a form by hand. The user could then provide data defining an image of the marked form using a scanner or a facsimile machine, for example. The machine could use the data to obtain original source verifying data defining the source verifying image. Or the machine could use the data to determine whether the source verifying image is the same as a source verifying image defined by original source verifying data.

A form marked with a source verifying image serves a function analogous to a key: A person possessing the marked form or a sufficiently high quality copy of it can use it to obtain machine operations. The possessor of the marked form can provide it to another person to allow the other to obtain machine operations. The marked form provides more certainty in source verification than a set of codes would, because an unauthorized user cannot provide the source verifying image without having possession of the original or a high quality copy.

Another aspect of the invention is based on the observation that source verifying images can serve other functions. For example, in a data filing system such as a fax server, a source verifying image could also have an appearance that suggests the content of a stored item of data to a user; further, the machine could use the source verifying image to access the stored item of data. Similarly, in an image processing system such as a copier, each job could be identified by a source verifying image, and the system could use a job's source verifying image to initiate, interrupt, or otherwise act upon the job. In general, the source verifying image could identify one of a number of alternatives.

This technique can be implemented, for example, by operating a machine to store a plurality of original source verifying images. Upon receiving data defining an image that shows a purported source verifying image, the machine could compare the purported source verifying image to each of the original images. If a matching original image is found, the machine could act appropriately in relation to the alternative identified by the matching original image.

Data defining source verifying images can include data defining each pixel of a source verifying image, such as a bitmap. In this case, a machine could measure similarity of images by comparing all pixels or by performing a correlation operation, such as by obtaining a Hausdorff distance. Then the machine could apply a criterion to determine whether the images are the same.

A machine implementing the invention can include image input circuitry and memory. Original source verifying data defining a first source verifying image can be stored in the memory. Data defining an image set that shows a second source verifying image can be received from the image input circuitry. The image set data and the original source verifying data can then be used to obtain a measure of similarity and apply a criterion to obtain data indicating whether the first and second source verifying images are the same. If so, an appropriate operation can be performed that is not performed if the images are not the same.

In this implementation, the original source verifying data can be stored so that it must be matched by a source verifying image from the image input circuitry before a related item of data can be accessed. The operation performed when a match occurs can include accessing the related item of data, which could be a document, for example. The document could be stored in response to a request that accompanies a source verifying image, and data defining the source verifying image could be registered with data defining the document in a database, a filing system, or a lookup table.

A software product implementing the invention can include a storage medium and data stored by the storage medium. The software product can be used in a machine that includes image input circuitry for providing data defining images and memory for storing data defining images. The data stored in the memory can include original source verifying data defining a first source verifying image. The data stored by the storage medium can include source verifier instructions the machine's processor can execute. In executing the source verifier instructions, the processor can receive image set data defining an image set that includes a second source verifying image from image input circuitry. The processor uses the image set data and the original source verifying data to obtain a measure of similarity and to apply a criterion to obtain data indicating whether the first and second source verifying images are the same. If so, the machine performs an operation that is not performed if the two images are not the same.

The techniques described above are advantageous because they make it unnecessary to employ sets of ASCII codes or other character codes as source verifiers. Instead, hand marked images can be used as source verifiers analogous to keys. The techniques are also advantageous because they make it possible for the user to provide a source verifying image that suggests a job or the content of an item of data to which it relates and that can similarly be used by a machine to identify the job or item of data in relation to which an operation is requested.

The following description, the drawings, and the claims further set forth these and other aspects, objects, features, and advantages of the invention.

DETAILED DESCRIPTION

A. Conceptual Framework

Figure 1:
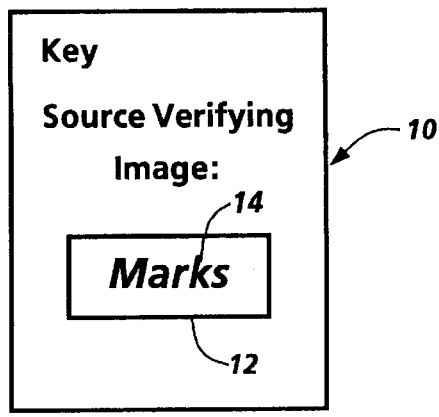
FIG. 1 is a schematic view of a form that includes a source verifying image.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" a one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

The term "mark" includes a single mark and also plural marks that together form a pattern of marks.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark in a field "indicates" a thing, an event, or a characteristic when the presence or shape of the mark depends on the existence or occurrence of the thing, event, or characteristic or on a measure of the thing, event, or characteristic.

An image "shows" a page, such as a page of a form or a sheet, when the image is an image of the page. An image set "shows" a page when the image set includes one or more images that, separately or in combination, show the page. An item of data "defines" a page when the item defines an image set that shows the page.

An image or image set "shows a document image" when the image or image set includes information about a document.

A "version" of a first image is a second image produced using an item of data defining the first image and that includes information from the first image. The second image may be identical to the first image, or it may be modified by loss of resolution, by changing the data defining the first image, or by other processes that result in a modified version.

An operation "creates" a page, such as a page of a form or a sheet, when the operation produces an item of data defining the page.

Each location in an image may be called a "pixel." In an array defining an image in which each item of data provides a value, each value indicating the color of a location may be called a "pixel value".

An item of data indicates a "measure of similarity" between two images if the item of data has a value that indicates a degree or extent to which the two images are similar.

A first item of data is produced by "applying a criterion" to a second item of data when the first item indicates whether the second item meets the criterion. An operation that applies a criterion produces such an item of data.

A "sameness criterion" is a criterion that can be applied to an item of data indicating a measure of similarity between two images to obtain an item of data indicating whether the two images are the same. Data indicating a sameness criterion can, for example, indicate a minimum or maximum value of the measure of similarity that satisfies the criterion, or a range within which or outside which the measure of similarity satisfies the criterion.

An operation uses data to "determine" whether a proposition is true if the operation uses the data to obtain other data indicating whether the proposition is true. For example, an operation can use data defining two images to determine whether the two images are the same, in which case the operation will obtain data indicating whether the two images are the same.

A "source verifying image" is an image that can be used to verify a source of signals such as signals requesting operations. A signal source can be verified by using data defining two source verifying images, referred to as an "original source verifying image" and a "purported source verifying image", to determine whether the two source verifying images are the same. A measure of similarity between the purported source verifying image and the original source verifying image must meet a sameness criterion in order to verify a signal source.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "character type" is a category of which a character may be an instance, such as the letter "a" or the number "3". A "version of a character type made by a human by hand" is a set of one or more marks made by the human by hand that are intended to be an instance of the character type.

An operation "recognizes" marks if the operation uses data defining an image of the marks to obtain data indicating a character type or other category of which the marks are likely to be an instance. An operation is performed "without recognizing" marks if the operation does not include obtaining data indicating a character or other category of which the marks are likely to be an instance.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

B. General Features

Figure 2:
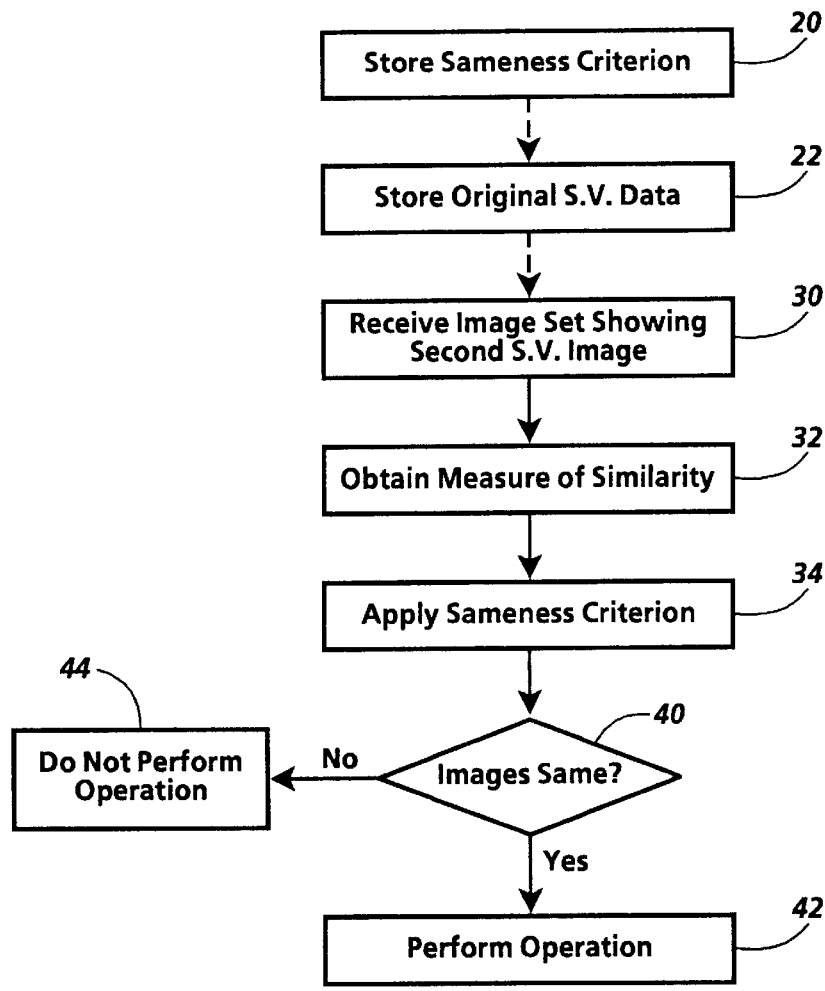
FIG. 2 is a flow chart showing general acts in using a source verifying image.
Figure 3:
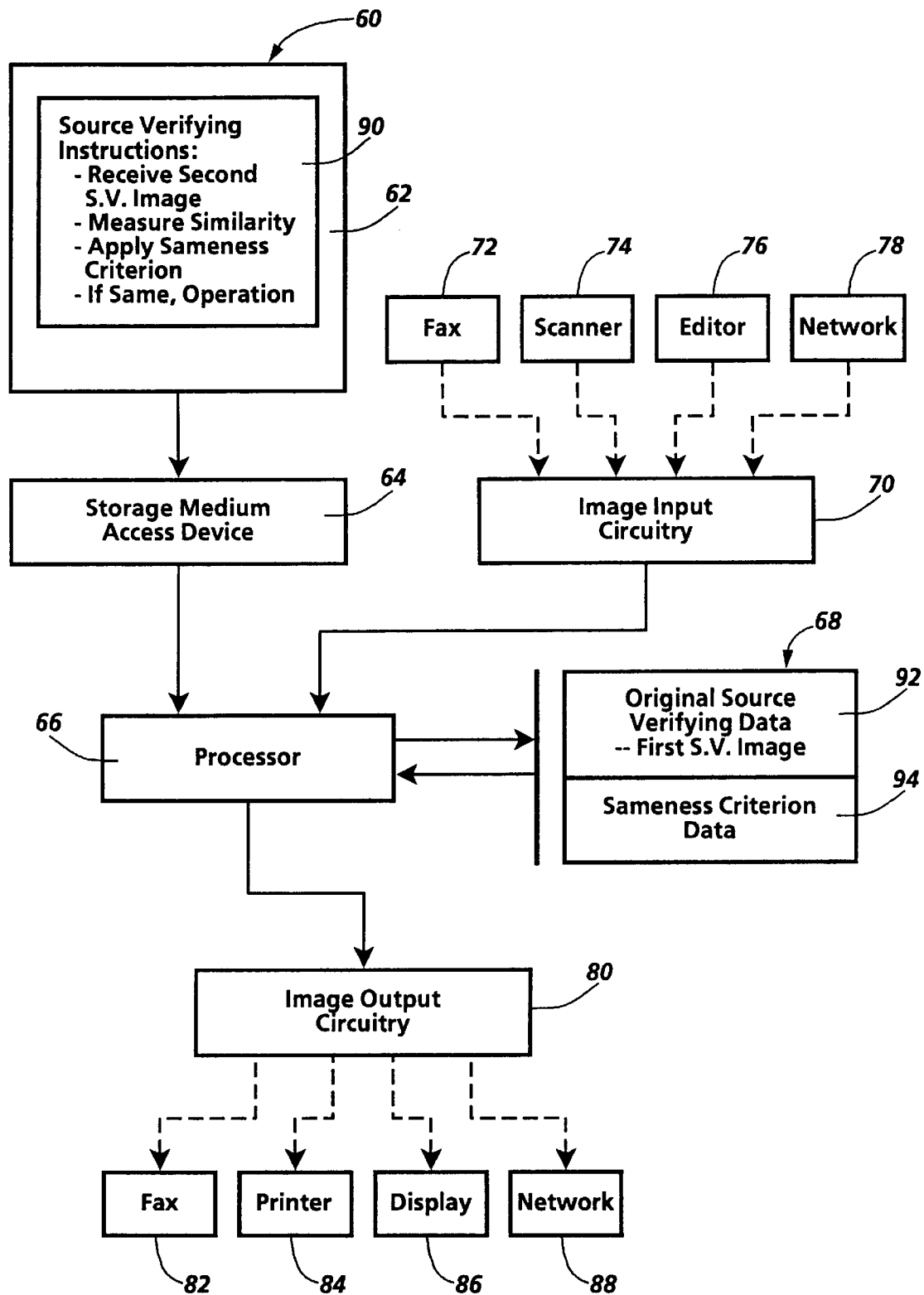
FIG. 3 is a schematic block diagram showing general components of a software product and a machine in which the software product can be used to implement the general steps in FIG. 2.

FIGS. 1–3 illustrate general features of the invention. FIG. 1 shows a form with a source verifying image. FIG. 2 shows general acts in using a source verifying image to obtain a machine operation. FIG. 3 shows general components of a software product and of a machine in which it can be used.

FIG. 1 shows form 10 with field 12 for a source verifying image as shown. Form 10 is called a key form because its function is analogous to a key. As shown, field 12 includes marks 14 made by a human by hand. A machine receiving data defining form 10 can respond by automatically storing original source verifying data defining an image of field 12 or by using data defining an image of field 12 to compare with original source verifying data to determine whether to perform an operation.

The general acts in FIG. 2 begin in box 20 by storing sameness criterion data indicating a sameness criterion. At some later time, as indicated by the first dashed line, the act in box 22 stores original source verifying (S.V.) data defining a first source verifying image, such as data defining an image of field 12 in form 10. At some yet later time, as indicated by the second dashed line, the act in box 30 receives data defining an image that shows a second source verifying image.

The act in box 32 uses the data defining the image from box 30 and the original source verifying data from box 22 to obtain data indicating a measure of similarity between the first source verifying image and the second source verifying image. Then, the act in box 34 uses the sameness criterion data from box 20 to apply the sameness criterion to the measure of similarity, obtaining data indicating whether the images are the same.

The act in box 40 branches based on the data obtained in box 34. If the data indicate that the two images are the same, the machine performs an appropriate operation, in box 42; if not, the machine does not perform the operation, in box 44.

As illustrated in FIG. 2, without a source verifying image that is sufficiently similar to the first source verifying image to satisfy the sameness criterion, a user cannot obtain the operation. Therefore, the precision of the sameness criterion determines the range of source verifying images that will be accepted as the same. For example, a very precise sameness criterion, such as a high threshold or a narrow range of similarity, might only accept a source verifying image that is the same in all respects as an original source verifying image. A less precise criterion might accept a differently scanned or differently transmitted version of the original source verifying image, which would allow for noise introduced by facsimile transmission or photocopying. A very imprecise criterion might accept a recreated version of the original source verifying image, such as a version redrawn from memory by a user. The choice of a sameness criterion therefore depends both on the desired level of precision and also on the amount of noise in the data defining the images being compared.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is also connected for accessing data stored in memory 68.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

Processor 66 can also be connected for providing data defining images to image output circuitry 80. The data could in turn be provided to fax machine 82, to printer 84, to display 86, or to network 88.

In addition to data storage medium 62, software product 60 includes data stored by storage medium 62. The stored data include data indicating source verifying instructions 90, which processor 66 can execute to perform acts like those in FIG. 2. In executing instructions 90, processor 66 receives data defining a second source verifying image from image input circuitry 70. Processor 66 uses the data defining the second source verifying image and original source verifying data 92 from memory to obtain data indicating a measure of similarity between the source verifying images. Processor 66 then uses sameness criterion data 94 to apply a sameness criterion to the measure of similarity to obtain data indicating whether the images are the same. If so, processor 66 performs an appropriate operation that is not performed if the images are not the same.

C. Possible Implementations

The general features described above could be implemented in numerous ways on various machines to perform source verification.

1. Hand Marked Images

Figure 4:
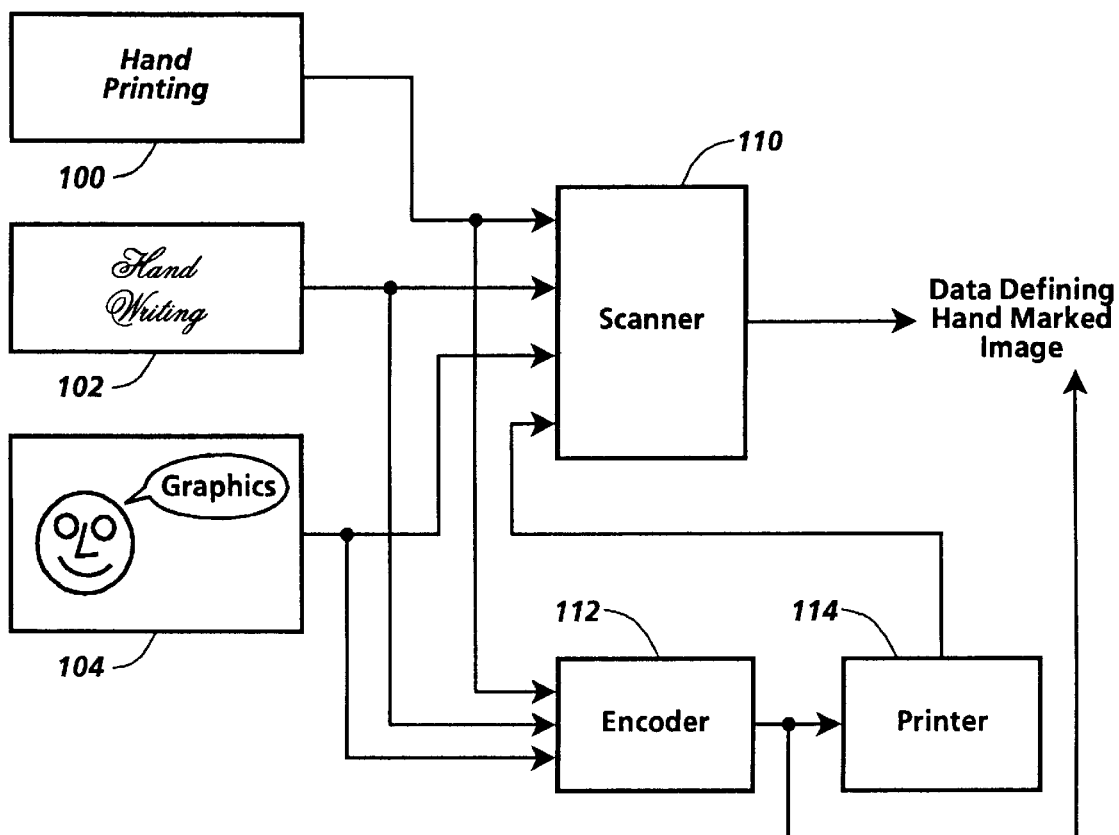
FIG. 4 is a schematic block diagram showing ways in which a human can produce a source verifying image by a hand marking operation.

A user can provide data defining a hand marked image in many ways. FIG. 4 illustrates ways in which a user can provide a hand marked image.

In FIG. 4, several examples of hand marked images are shown at left. Image 100 was produced by hand printing, image 102 by hand writing, and image 104 by hand drawing graphics.

If the marking medium is a sheet, scanner 110 can receive a sheet holding any of the hand marked images in FIG. 4. Scanner 110 operates on the sheet to provide data defining a hand marked image to be used as a source verifying image.

If the marking medium is a marking surface of an electronic device that can sense marks, encoder 112 can receive signals from the electronic device and use the signals to obtain data defining the hand marked image. This data can then be provided to printer 114 to obtain a sheet on which marks are printed, and this sheet can be provided to scanner 110. Scanner 110 operates on the sheet to provide data defining a hand marked image to be used as a source verifying image.

FIG. 4 also shows that the data from encoder 112 could be used directly as data defining the hand marked image. This would be appropriate, for example, if the sameness criterion were very imprecise so that a user could redraw an original source verifying image from memory.

A source verifying image could be produced in any of the ways shown in FIG. 4, in a combination of the ways shown in FIG. 4, or in any other appropriate way.

2. Storing Original Source Verifying Image Data

Figure 5:
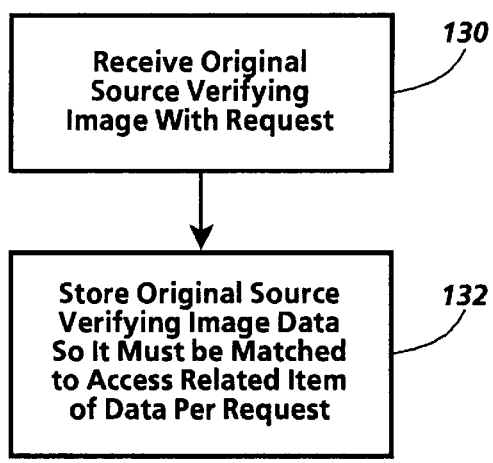
FIG. 5 is a flow chart showing general acts in storing data defining an original source verifying image.
Figure 6:
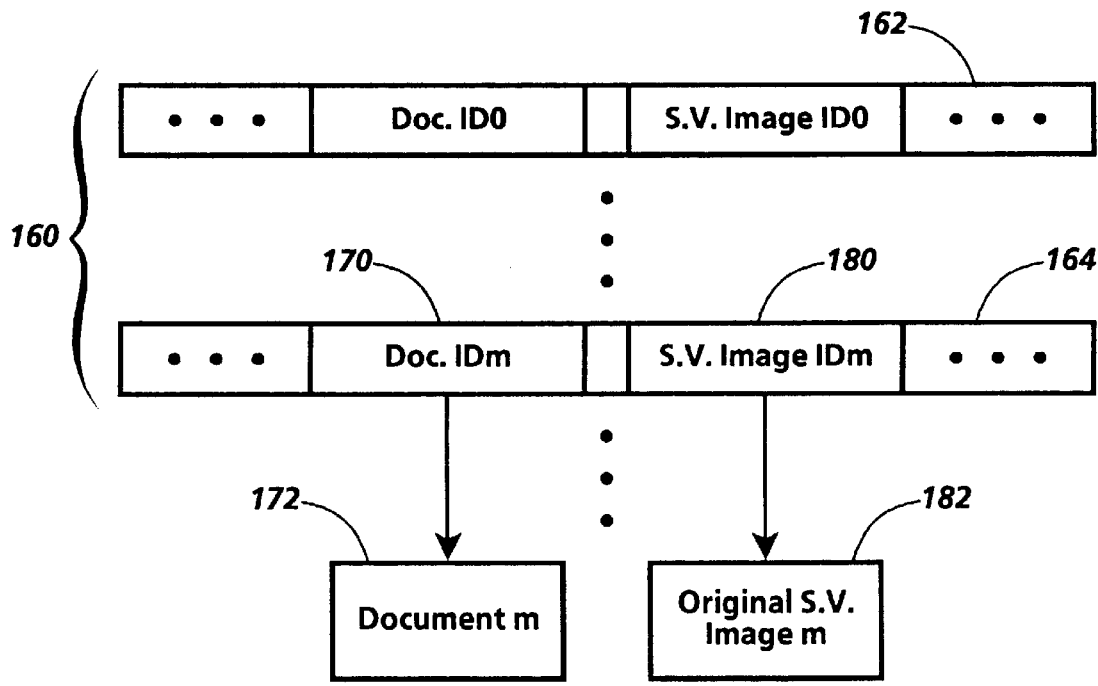
FIG. 6 is a schematic block diagram showing an item and a source verifying image stored in a database.
Figure 7:
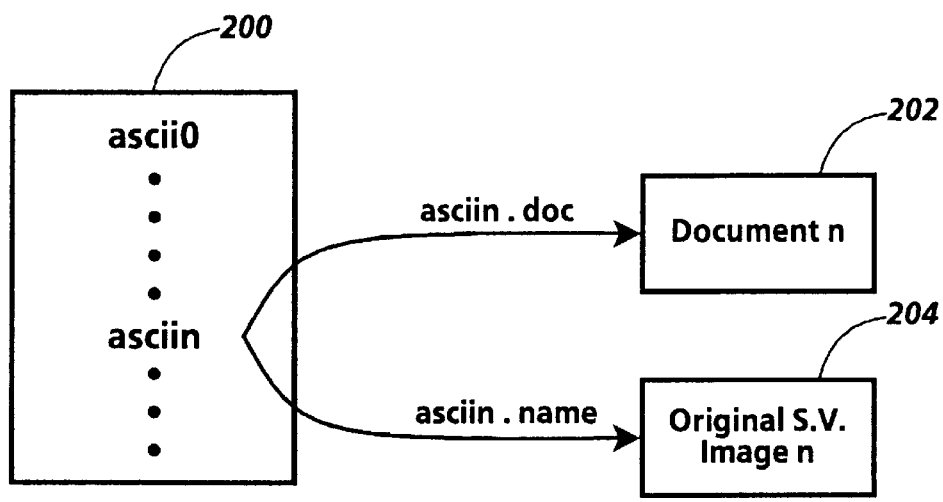
FIG. 7 is a schematic block diagram showing an item and a source verifying image stored in a filing system.

Data defining a source verifying image and a related item of data such as a document or a job state description could be stored in various ways. FIG. 5 shows general acts in storing such data. FIG. 6 shows how an original source verifying image and a related item of data could be stored in a database. FIG. 7 shows how an original source verifying image and a related item of data could be stored in a filing system.

The act in box 130 in FIG. 5 receives a signal that includes data defining an original source verifying image and that also includes a request. The act in box 132 responds by storing data defining the original source verifying image in such a way that a purported source verifying image that is the same as the original source verifying image must be received before a related item of data can be accessed, in accordance with the request.

FIG. 6 shows entries in database 160 beginning with zeroth entry 162 and including mth entry 164. FIG. 6 also shows stored data to which mth entry 164 is linked.

As shown, mth entry 164 includes several fields. Document ID field 170 includes a pointer to item of data 172, document m. Source verifying (S.V.) image ID field 180 includes a pointer to item of data 182, data defining original source verifying image m, which a purported source verifying image must match before document m can be accessed. As a result, when data, such as from field 180, is used to access original source verifying image data, such as item of data 182, data, such as from field 170, is also available to access the related item of data, such as item of data 172.

Figure 11:
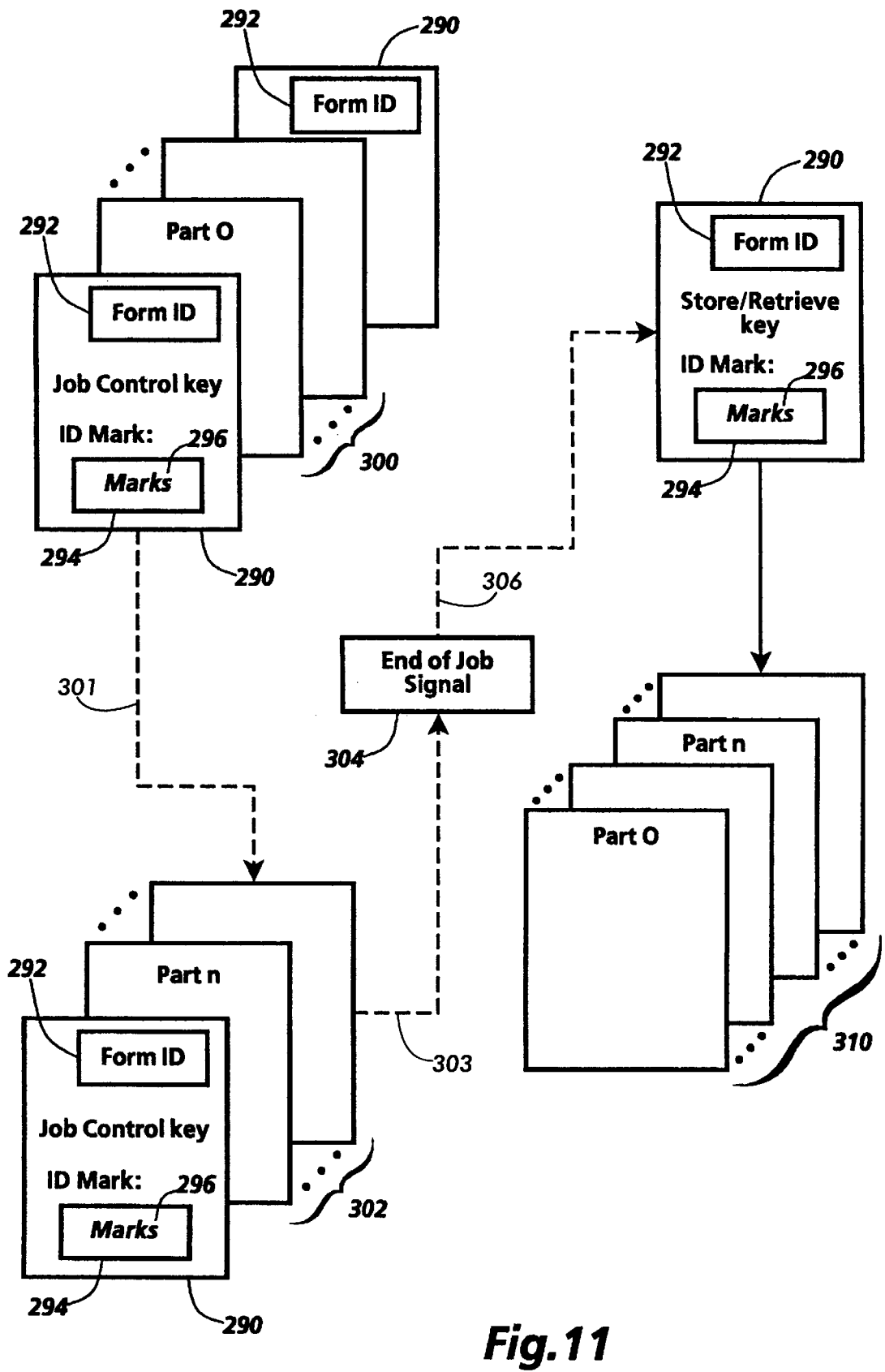
FIG. 11 is a schematic flow diagram of the use of a form with a source verifying image to control a copying job.

The technique illustrated in FIG. 6 could be implemented as described in relation to FIG. 11 of copending coassigned U.S. patent application Ser. No. 07/855,987, entitled "Method and System for Labeling a Document for Storage, Manipulation, and Retrieval", incorporated herein by reference.

FIG. 7 shows directory 200 listing ascii file names in a file system such as Unix, illustratively showing the zeroth name "ascii0" and the nth name "asciin". The suffix ".doc" can be annexed to the nth file name in directory 200 to access item of data 202, document n. Similarly, the suffix ".name" can be annexed to the nth file name to access item of data 204, data defining original source verifying image n, which a purported source verifying image must match before document m can be accessed. As a result, when a file name from directory 200 is used to access original source verifying image data, such as item of data 204, the file name is also available to access the related item of data, such as item of data 202.

3. Responding to Purported Source Verifying Image

Figure 8:
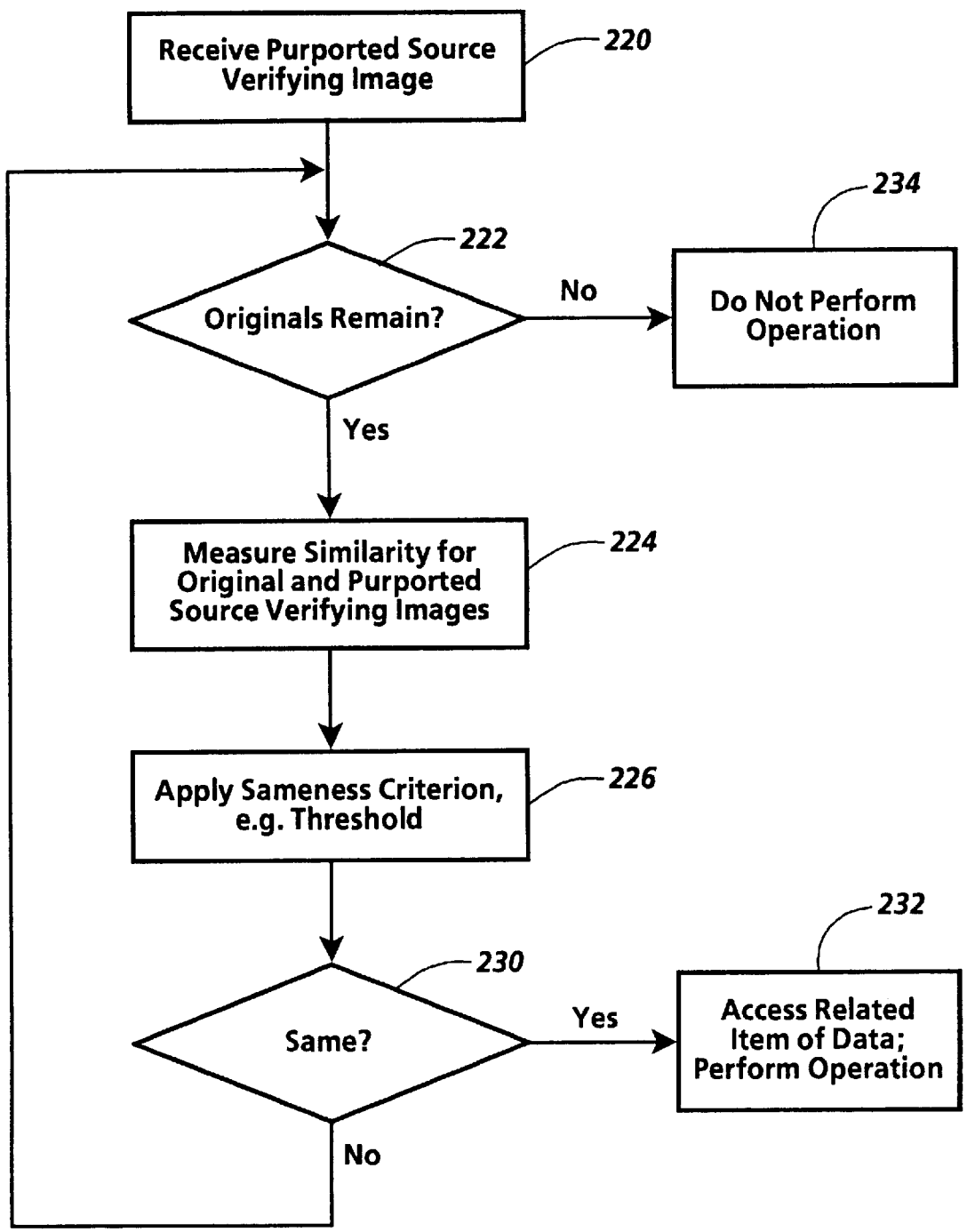
FIG. 8 is a flow chart showing acts in responding to data defining a purported source verifying image.
Figure 9:
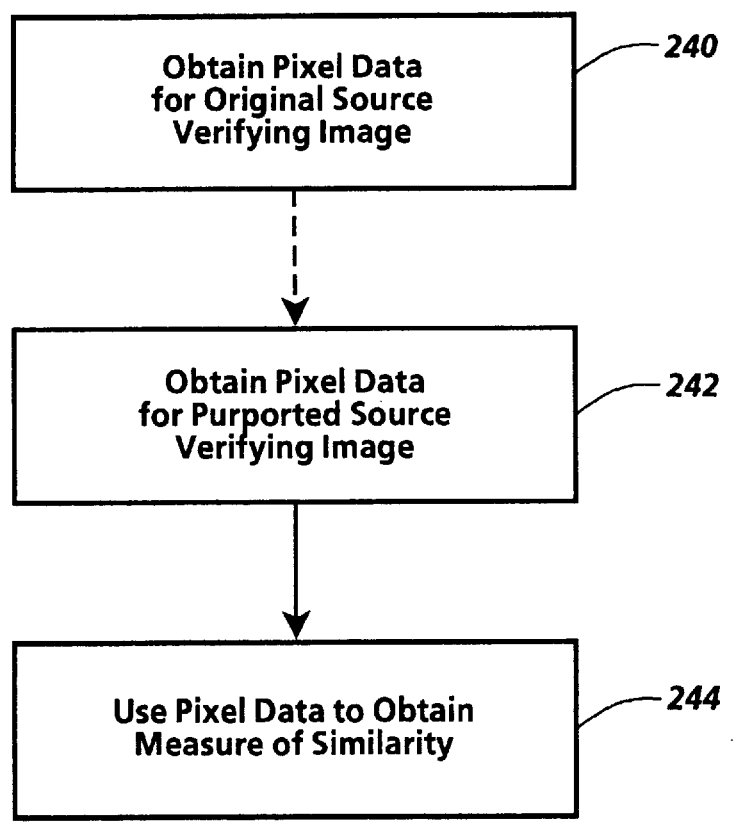
FIG. 9 is a flow chart showing acts in obtaining a measure of similarity using pixel data defining an original source verifying image and a purported source verifying image.

A machine with stored original source verifying image data could respond to a purported source verifying image in various ways. FIG. 8 shows general acts in responding to data defining a purported source verifying image. FIG. 9 shows acts in using pixel data defining an original source verifying image and a purported source verifying image to obtain a measure of similarity.

The act in box 220 in FIG. 8 receives data defining a purported source verifying image. The act in box 222 begins a loop each iteration of which compares the purported source verifying image with an image defined by stored original source verifying image data. During each iteration, the act in box 224 obtains data indicating a measure of similarity for the next original source verifying image and the purported source verifying image from box 220.

The act in box 226 applies a criterion of sameness to the measure of similarity from box 224 to obtain data indicating whether the two images are the same. The criterion of sameness can be chosen appropriately for the measure of similarity obtained in box 224, as discussed above; for example, if the measure of similarity is a Hausdorff distance or bitmap correlation, the criterion can be a threshold that obtains a desired level of precision. The act in box 230 branches based on the data obtained in box 226. If the sameness criterion is met, the act in box 232 accesses an item of data related to the original source verifying image data that met the sameness criterion, and an appropriate operation is performed.

If an iteration of the loop is performed for each original source verifying image without meeting the criterion of sameness, the operation is not performed, as indicated in box 234.

The act in box 224 in FIG. 8 could be performed with the steps in FIG. 9.

The act in box 240 in FIG. 9 obtains data indicating a value for each pixel of the original source verifying image. This act can be performed using data defining an image that includes the source verifying image within a field, for example, in which case the pixel data indicate the values of pixels within the field. As suggested by the dashed line in FIG. 9, this act can be performed when the original source verifying image data is stored, and the pixel data can be included in the original source verifying image data. This act can also include normalization or any other operations necessary so that the same similarity measurement can be performed on a number of source verifying images. Such normalizations may be necessary, for example, to eliminate distortions introduced by a scanner or during signal transmission.

The act in box 242 is performed when data defining a purported source verifying image is received. This act obtains data indicating a value for each pixel of the purported source verifying image. This act can be performed using data defining an image that includes the purported source verifying image within a field, for example, in which case the pixel data indicate the values of pixels within the field. As in box 240, this act can also include normalization or any other operations necessary to facilitate measurement of similarity to original source verifying images.

The act in box 244 then uses the pixel data from boxes 240 and 242 to obtain data indicating a measure of similarity between the original and purported source verifying images. For example, every pixel value in the original could be compared with the purported source verifying image. Or a Hausdorff distance or other fuzzy correlation could be obtained between the two images, as described in copending, coassigned U.S. patent application Ser. No. 08/096,198, entitled "Data Access Based on Human-produced Images" ("the data access application"), incorporated herein by reference. The use of a Hausdorff distance to compare images is described in Huttenlocher, D. P., Klanderman, G. A., and Rucklidge, W. J., "Comparing Images Using the Hausdorff Distance," Cornell University Department of Computer Science, CUCS TR 91-1211 (revised), 1991, pp. 1–35, incorporated herein by reference.

The sameness criterion applied in box 226 in FIG. 8 can be a threshold or other criterion appropriate to the measure of similarity obtained in box 244 in FIG. 9. For a moderately high level of precision, a sameness criterion should be chosen that allows transduction errors such as distortions introduced during scanning, but that does not allow errors introduced by tracing or reconstructing an image of the original marks in a source verifying image.

4. User Interface

Figure 10:
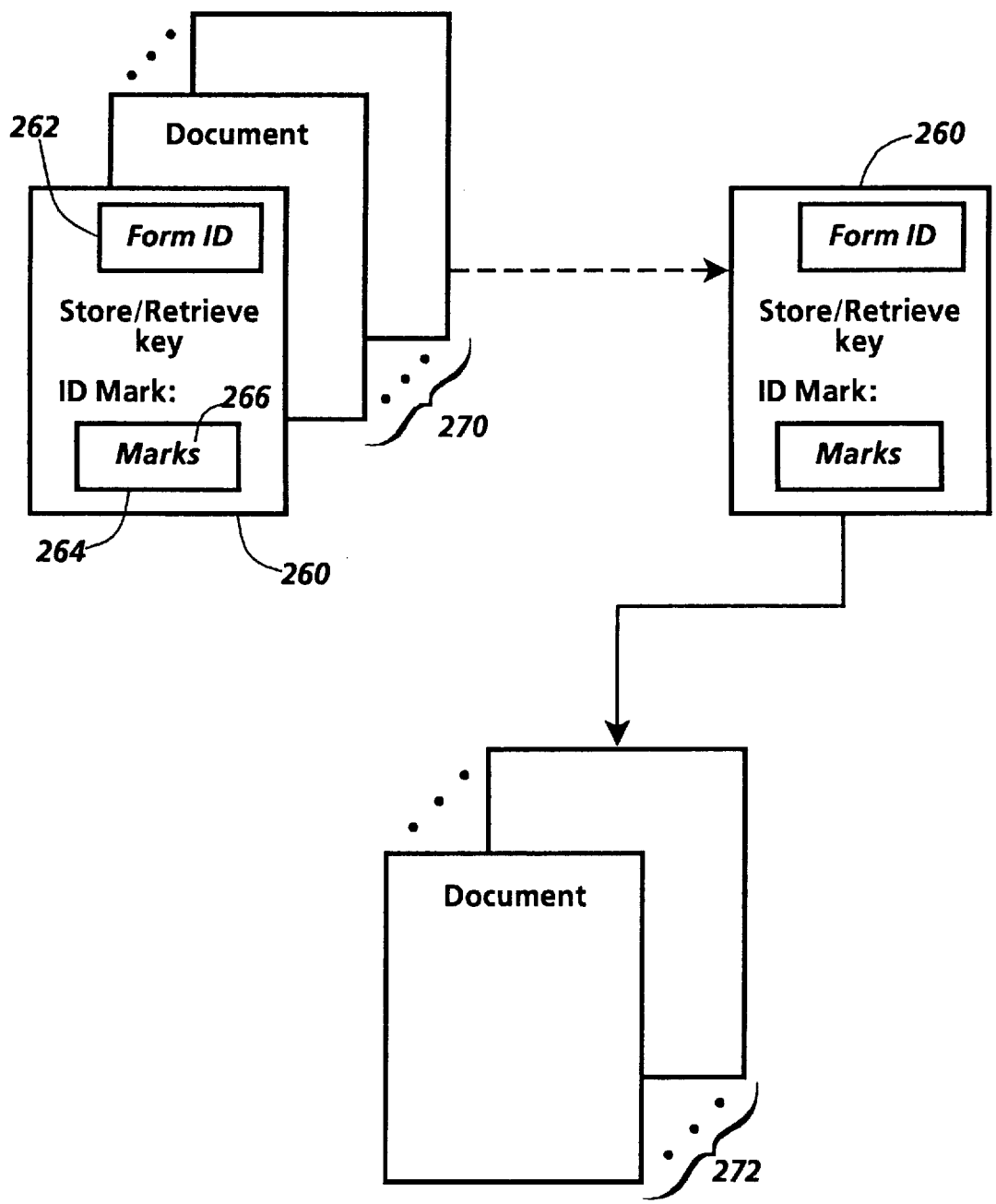
FIG. 10 is a schematic flow diagram of the use of a form with a source verifying image to store and retrieve a document.

Many user interface techniques could employ source verifying images. FIG. 10 shows features of a user interface for storing and retrieving documents. FIG. 11 shows features of a user interface for job control operations.

The PaperWorks™ Software described above provides a paper user interface. In other words, a user can provide input signals on paper and can receive output signals on paper. Examples of how a document and an image domain document label can be stored using a form and of how a stored document can be retrieved using a form with a list of documents are described in copending coassigned U.S. patent application Ser. No. 07/855,987, entitled "Method and System for Labeling a Document for Storage, Manipulation, and Retrieval", incorporated herein by reference. Similarly, paper user interface techniques can employ source verifying images.

Form 260 in FIG. 10 can be used as a key to request storage and retrieval of a document. Form identification information 262 can be used by a machine to obtain a description of form 260. The description can indicate that form 260 is requesting either a store operation or a retrieve operation, as also indicated by human-readable words on form 260. The description can also indicate that field 264, labeled as containing identifying (ID) marks by human-readable words, includes a source verifying image, either an original source verifying image or a purported source verifying image.

If a machine receives data defining an image of form 260 with marks 266 in field 264, and if form 260 is followed by data defining an image of document 270, the machine can respond by automatically performing an operation that stores data defining an image of document 270. In addition, the machine can automatically store data defining an image of marks 266 so that the data defining document 270 cannot be accessed unless a purported source verifying image is received that is the same as the stored image of marks 266. Before these automatic operations, the machine can perform acts like those in FIG. 8 to determine whether marks 266 are the same as any previously stored original source verifying image; if not, the machine treats marks 266 as an original source verifying image and responds by performing the automatic operations described above.

At a later time, as indicated by the dashed line in FIG. 10, the machine again receives data defining an image of form 260 with marks 266 in field 264. The machine can respond by determining that marks 266 are the same as the original source verifying image stored when form 260 was previously received. The machine can then automatically respond by using the stored data defining document 270 to obtain data defining document 272, a version of document 270. The data defining document 272 can then be provided to an image output device.

The technique in FIG. 10 could be modified in various ways. For example, to request retrieval, a user could provide data defining a set of images. The set could include an image of form 260 as in FIG. 10, and could also include another form specifying a retrieval operation or another form with a different source verifying image in response to which the machine performs a retrieval operation.

Form 290 in FIG. 11 can similarly be used as a key to request job control operations. Form identification information 292 can be used by a machine to obtain a description of form 290. The description can indicate that form 290 is requesting a job control operation, as also indicated by human-readable words on form 290. The description can also indicate that field 294, labeled as containing identifying (ID) marks by human-readable words, includes a source verifying image, either an original source verifying image or a purported source verifying image.

The first time a machine receives data defining an image of form 290 with marks 296 in field 294, the machine can respond by automatically setting up a job. If form 290 is followed by data defining an image of document 300, the machine can respond by automatically performing an operation that stores data defining an image of document 300 as part 0, the first part of the job. As described in relation to FIG. 10, before these automatic operations, the machine can perform acts like those in FIG. 8 to determine whether marks 296 are the same as any previously stored original source verifying image.

After receiving data defining an image of document 300, when the machine again receives an image of form 290 with marks 296 in field 294, the machine can respond by automatically interrupting the job. In other words, the machine can break the job stream so that the job can later begin where it left off, allowing the user to provide the remainder of the job at later times or from one or more other scanners.

At a later time, as indicated by the first dashed line 301 in FIG. 11, the machine again receives data defining an image of form 290 with marks 296 in field 294. The machine can respond by determining that marks 296 are the same as the original source verifying image stored when form 290 was first received. The machine can then determine that form 290 is followed by data defining an image of document 302, the nth part of the job. Each time the machine receives form 290 with marks 296 in field 294 and followed by a document, the machine can then automatically respond by again beginning the job, storing data defining an image of document 302 as part n of the job.

Some time after receiving data defining document 302, as indicated by the second dashed line 303 in FIG. 11, the machine receives signal 304 indicating the end of a job. For example, this signal could be a signal from a paper feeder indicating no more sheets to be fed; a signal indicating the end of a facsimile transmission; or any other signal indicating the end of the job.

At a later time, as indicated by the third dashed line 306 in FIG. 11, the machine again receives data defining an image of form 290 with marks 296 in field 294. This time, however, form 290 is not followed by a document, so that the machine determines that this is a request for retrieval of the job. The machine can then automatically respond by using the stored data defining documents 300 through 302 to obtain data defining document 310, a version that includes parts 0 through n. The data defining document 310 can then be provided to an image output device.

The technique in FIG. 11 could be modified in various ways. As in FIG. 10, a user could provide data defining a set of images requesting a retrieval operation, with the set including another form specifying a retrieval operation or including another form with a different source verifying image in response to which the machine performs a retrieval operation. Or, an operation other than retrieval could be requested, such as an operation that obtains data defining document 310 by assembling or reordering documents 300 through 302, by retrieving other information to be included in one of documents 300 through 302, by removing annotations, noise, or other extraneous information from one of documents 300 through 302, and so forth. Or a parameter of an operation could be indicated.

FIG. 11 illustrates several different uses of a form with a source verifying image. Form 290 first precedes document 300 to indicate the beginning of a new job. Form 290 then follows document 300 to indicate an interruption of the job. Form 290 then precedes document 302 to indicate an addition to the job. Form 290 could be provided in box 304 as the end of job signal. Finally, form 290 can be provided, alone or in a set of images, to request an operation to be performed on the job, such as a retrieval operation. The meaning of form 290 thus depends both on the state of the job and also on other information provided in an image set that includes it. For example, in some cases form 290 may simply represent the job, in others it may represent a process performed on the job, and in others it may represent a transition between two states of the job in which form 290 has different meanings.

Key forms 260 and 290 can be created and many copies can be made in which ID mark fields 264 and 294 are blank. Then, when a user desires an operation, the user can mark the ID mark field of a form to create an original source verifying image. Once the marked form has been used, it can subsequently be reused as a key to request a machine operation such as retrieval of a document or a job control operation for a job. If the marked form is lost, the machine operation is unavailable.

D. Possible Applications

Figure 12:
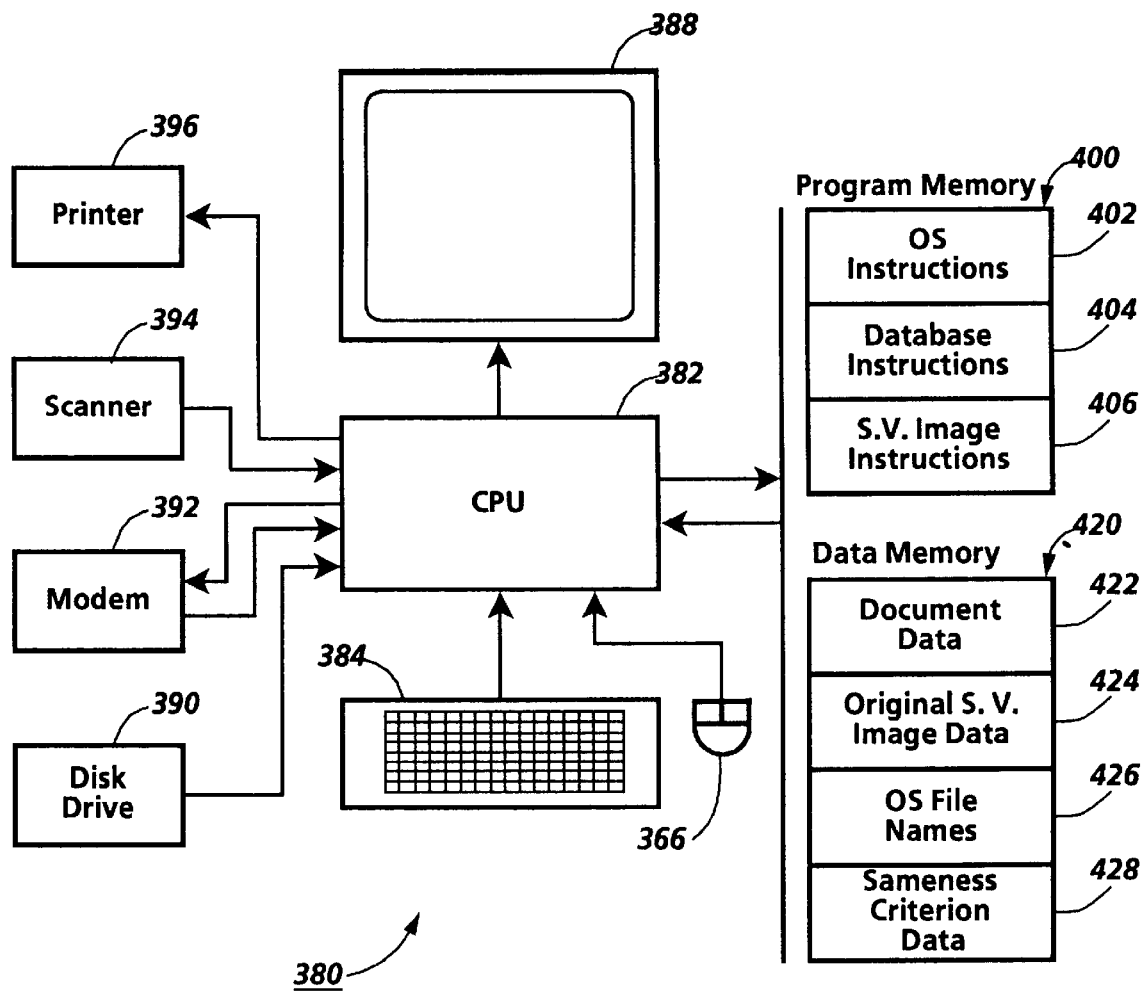
FIG. 12 is a schematic block diagram of an application of source verifying images in a personal computer system.
Figure 13:
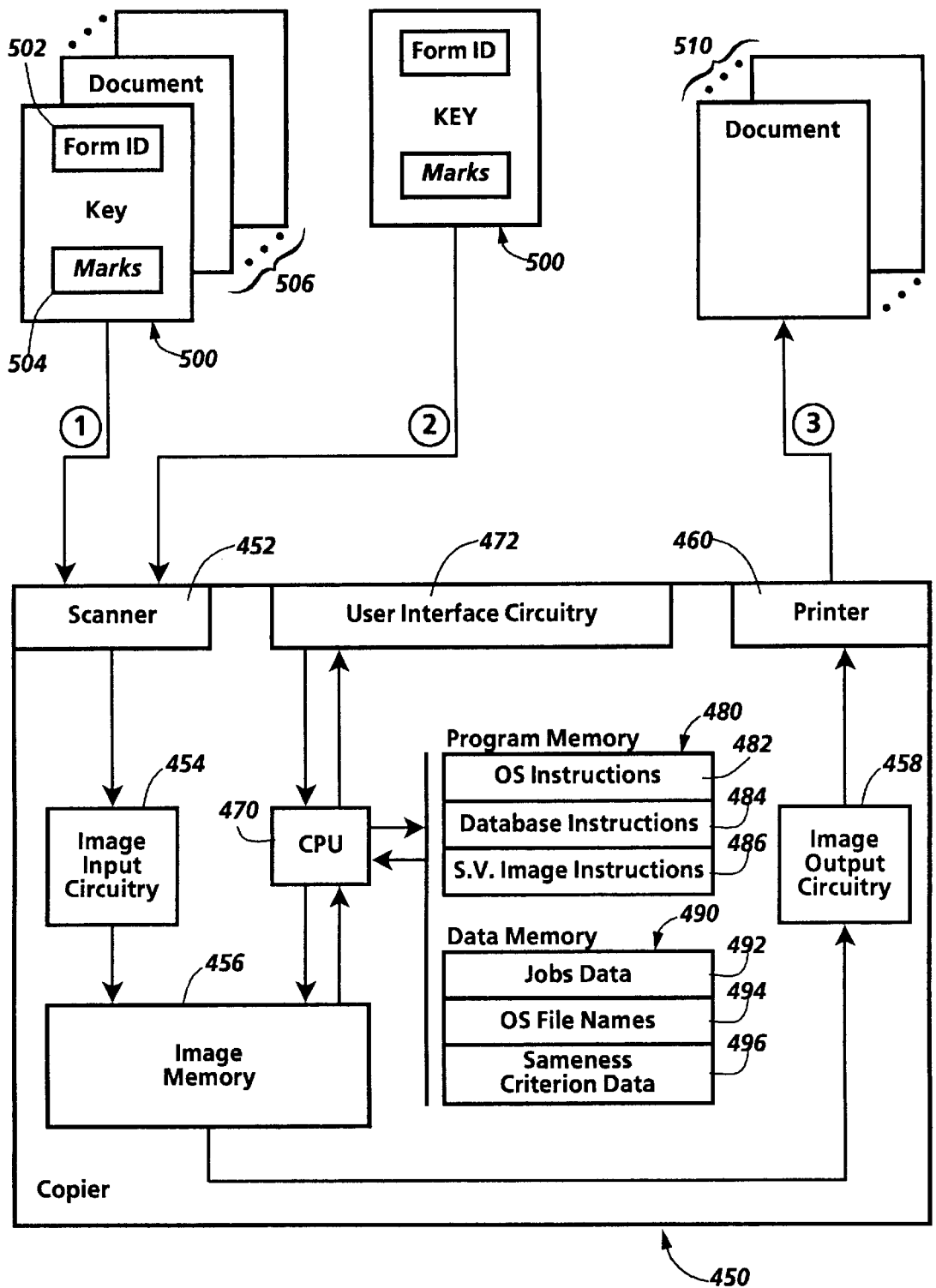
FIG. 13 is a schematic block diagram of an application of source verifying images in a copier.

The invention could be applied in many ways in a wide variety of machines. FIG. 12 illustrates how the invention could be applied in a personal computer in a manner similar to the PaperWorks™ software product described above. FIG. 13 illustrates how the invention could be applied in a copier.

System 380 in FIG. 12 includes CPU 382, which can be the CPU of a personal computer such as an IBM PC compatible machine. CPU 382 is connected to receive user input signals from keyboard 384 and mouse 386, and can present images to a user through display 388. CPU 382 is also connected to a number of other peripheral devices, illustratively including disk drive 390, modem 392, scanner 394, and printer 396.

Program memory 400 stores operating system (OS) instructions 402, which can be a version of DOS; database instructions 404; and source verifying (S.V.) image instructions 406. Database instructions 404 and S.V. image instructions 406 could be obtained in the form of a software product stored on a floppy disk, diskette, or CD-ROM, and accessed for storage in program memory 400 by disk drive 390. Data memory 420 stores document data 422 defining documents; original S.V. image data 424 defining original source verifying images of documents; OS file names 426 for documents; and sameness criterion data 428.

System 380 can obtain items for storage in document data 422 in many ways: Data defining a document could be produced interactively by executing editing instructions (not shown), such as an image editor or a conventional word processor. Data defining a previously produced document could be retrieved from a storage medium, such as by disk drive 390. Data defining an image of a document could be obtained from scanner 394. Data defining a document in image form or in a page description language could be received from a remote location through modem 392.

Similarly, system 380 can obtain data defining a source verifying image for an item in document data 422 in several ways: A user could use scanner 394 to obtain data defining an image in which a human has made marks that are a source verifying image. Or a user could produce data defining a source verifying image elsewhere and provide it to system 380 through modem 392, such as by making a fax transmission to modem 392. The source verifying image could be provided on a form that can be used to request operations relating to data defining a document.

Sameness criterion data 428 could be obtained from an appropriately authorized user, either interactively or by retrieval from a storage medium.

S.V. image instructions 406 could be executed to obtain a measure of similarity and use sameness criterion data 428 to obtain data indicating whether the source verifying image is the same as any of the original source verifying images indicated by original S.V. image data 424. If not, database instructions 404 could be executed to store data defining the source verifying image in original S.V. image data 424 so that an operation on data defining a related document in document data 422 can only be performed if the source verifying image is matched.

If S.V. image instructions 406 instead obtain data indicating that the source verifying image is the same as one of the original source verifying images, database instructions 402 can be executed to access data defining the related document in document data 422. An appropriate operation could then be performed.

Copier 450 in FIG. 13 includes an image path defined by scanner 452, image input circuitry 454, image memory 456, image output circuitry 458, and printer 460. The manner in which data defining images are transferred along this path is controlled to an extent by CPU 470, although bandwidth along the image path can be increase with appropriate techniques that do not require concurrent operations of CPU 470, such as wideband buses, direct virtual memory access (DVMA) and other direct memory access techniques, and techniques for compressing and decompressing data defining an image. CPU 470 can receive signals from user interface circuitry 472 indicating actions of a user and can provide signals to user interface circuitry 472 to provide information to a user.

CPU 470 can execute instructions from program memory 480, including operating system (OS) instructions 482, which can be a version of DOS; database instructions 484; and source verifying (S.V.) image instructions 486. In executing, CPU 470 can access data in data memory 490, including jobs data 492 defining a queue of jobs to be performed, OS file names 494 for accessing files in image memory 456, and sameness criterion data 496.

FIG. 13 also illustrates how source verifying images could be used to control operations of copier 450. The illustrated operations include storing and retrieving data defining an image of a document to provide a copy of the document.

First, scanner 452 scans form 500, which includes form identifier 502 and source verifying image 504, and document 506. Data defining images of form 500 and document 506 are provided by image input circuitry 454 and stored in a job file in image memory 456, and CPU 470 executes database instructions 484 to set up a job in jobs data 492 and to add the job file's name to OS file names 494.

When the job reaches the head of a jobs queue defined by jobs data 492, CPU 470 executes S.V. image instructions 486 to perform image processing on the first page of the image set defined by the job file to determine whether it is a form. CPU 470 then uses form identifier 502 to obtain a description of form 500, and uses the description to obtain data defining source verifying image 504, which is stored in image memory 456. After obtaining a measure of similarity and using sameness criterion data 496 to obtain data indicating that source verifying image 504 does not match any original source verifying images previously stored in image memory 456, CPU 470 registers source verifying image 504 in jobs data 492 as an original source verifying image so that further operations cannot be performed on the job file unless data defining the same source verifying image is received.

Second, scanner 452 again scans form 500. As above, CPU 470 sets up a job and, when the job reaches the head of the jobs queue, performs image processing to obtain data defining source verifying image 504. Since source verifying image 504 is the same as the stored original source verifying image so that the criterion indicated by sameness criterion 496 is met, CPU completes this second job by causing transfer of data defining document 506 from image memory 456 to image output circuitry 458 so that printer 460 prints document 510, a copy of document 506.

E. Miscellaneous

The invention has been described in relation to implementations in which an operation is performed if a purported source verifying image matches an original source verifying image. The invention might also be implemented so that an additional criterion must be met before the operation is available. For example, the operation might be performed if the source verifying images match and if the user also provides a human-produced image of the type describe in copending coassigned U.S. patent application Ser. No. 08/096,198, entitled "Data Access Based on Human-Produced Images", incorporated herein by reference. Or the operation might be performed if multiple forms are received, each with a unique form identifier and each with a purported unique source verifying image that matches an original source verifying image for the form. Or the operation might be performed only if the source verifying image match and an encoded version of the source verifying image also matches; the encoded version could be a hash encoded version or a version encoded along the lines described in copending coassigned U.S. patent application Ser. No. 07/887,563, entitled "Hardcopy Lossless Data Storage and Communications for Electronic Document Processing Systems", incorporated herein by reference.

The invention has been described in relation to implementations that obtain a measure of similarity and apply a sameness criterion. The invention could also be implemented to obtain more than one measure of similarity, with a partial sameness criterion for each measure, and with an overall sameness criterion that combines the results of the partial sameness criteria, such as by applying an OR operation or an AND operation or counting the partial sameness criteria that indicate images are the same and comparing the count with a threshold.

The invention has been described in relation to implementations that use measures of similarity such as the Hausdorff distance or another correlation. In general, however, the invention could be implemented with any suitable technique for measuring similarity between images. For example, the invention might be implemented with the technique described in copending, coassigned U.S. patent application Ser. No. 07/535,091, entitled "Comparison of Image Shapes Based on Near Neighbor Data," now issued as U.S. Pat. No. 5,255,354 and incorporated herein by reference.

The invention has been described in relation to implementations in which data indicating a sameness criterion are stored as a distinct item of data in data memory. In general, however, the invention could be implemented with sameness criterion data embedded in a data structure or in a procedure, whether explicit or implicit.

The invention has been described in relation to possible implementations in which source verifying image data and a stored item of data are both registered in a database, in a filing system, or in a data structure such as a lookup table so that when source verifying image data is accessed, data is also available to access a related item of data. The invention might also be implemented by including a pointer to the item of data in the source verifying image data or by any other technique making it possible to access an item of data from source verifying image data.

The invention has been described in relation to source verifying images that show marks made by a human by hand, but source verifying images could also be obtained in other ways. For example, a source verifying image could be obtained by a user by cutting and pasting together segments of images or by any other operation that produces a unique image. More generally, a source verifying image could be a non-unique image such as an image produced using a typewriter, printer, or other machine, provided that a user is able to prevent others from viewing the image long enough to recreate it.

The invention has been described in relation to possible implementations in which source verifying image data is stored so that a related item of data can be accessed for retrieval or for job control operations. The invention might also be implemented so that a related item of data can be accessed to obtain or modify information about a user's access rights or other rights relating to machine operations, such as rights to read, write, and modify stored data or rights to add, delete, or change access rights of users.

The invention has been described in relation to possible implementations with a user interface using forms. The invention might also be implemented with a user interface that does not use forms. Data defining source verifying images could be obtained independently of forms, such as from scanning operations.

The invention has been described in relation to possible implementations in which a stored item of data defines an image, such as an image of the pages of a document. The stored items of data could instead be document descriptions or process descriptions.

The invention has been described in relation to possible software implementations using conventional hardware, but the invention might be implemented with specialized hardware.

Although the invention has been described in relation to various possible implementations, together with modifications, variations, and extensions thereof, other implementations, modifications, variations, and extensions are within the scope of the invention. The invention is therefore not limited by the description contained herein or by the drawings, but only by the claims.

What is claimed:

1. A machine for performing source verification so as to determine whether an operation may be performed, the machine comprising:

image input circuitry for obtaining image set data as input;

a memory device having data stored therein; and a processor connected for receiving image set data from the image input circuitry; the processor further being connected for accessing the data stored in said memory device;

the data stored in the memory device comprising:

original source verifying data defining and original source verifying image, said original source verifying image associated with said operation;

match criterion data defining a criterion for use in generating sameness data indicating whether two images are the same; and instruction data indicating instructions the processor can execute; said instruction data including instructions for:

receiving image set data from the image input circuitry, the image set data defining an image set that shows a purported source verifying image;

comparing the image set data and the original source verifying data from memory to obtain similarity measure data; the similarity measure data indicating a measure of similarity between the original and purported source verifying images;

comparing the match criterion data and the similarity measure data to obtain sameness data indicating whether the original and purported source verifying images are the same; and performing said operation only if the sameness data indicate that the original and purported source verifying images are the same.

2. The machine of claim 1 in which the input image circuitry is connected for receiving facsimile transmissions.

3. The machine of claim 1 wherein document data defining an image of a document is further stored in said memory device; the operation performed by the processor if the sameness data indicate that the original and purported source verifying images are the same is an operation that accesses the document data, so that a source verifying image that is the same as the original source verifying image must be received before the document data can be accessed.

4. The machine of claim 3, further comprising image output circuitry for providing data defining images as output; said instruction data further comprising instructions for: extracting output image data from said document data; the output image data defining a version of the image of the document; and providing the output image data to the image output circuitry.

5. The machine of claim 4 in which the output image circuitry is connected for providing facsimile transmissions.

6. The machine of claim 3 wherein a database system is further stored in said memory; the database system storing the document data and the original source verifying data so that the processor, upon accessing the original source verifying data, can access the document data.

7. The machine of claim 1 in which the machine is a fax server.

8. The machine of claim 1 in which the machine is a copier.

9. The machine of claim 1 in which the image input circuitry is connected for receiving facsimile transmissions; the image set data from the image input circuitry being obtained from a facsimile transmission; the machine further comprising:

image output circuitry connected for providing facsimile transmissions, the processor being connected for receiving data from facsimile transmissions from the image input circuitry and for providing data for facsimile transmissions to the image output circuitry; the operation performed by the processor being an operation that provides output facsimile data to the image output circuitry for facsimile transmission; the processor not providing the output facsimile data to the image output circuitry for facsimile transmission if the sameness data indicate that the original and purported source verifying images are not the same.

10. The machine of claim 1 in which the image input circuitry comprises a scanner; the machine further comprising:

a printer;

the processor being connected for receiving data defining images from the scanner and for providing data defining images to the printer; the operation performed by the processor being an operation that provides print output data to the printer; the processor not providing the print output data to the printer if the sameness data indicate that the original and purported source verifying images are not the same.

11. An article of manufacture for use in a machine that includes:

image input circuitry for obtaining data defining images as input;

memory for storing data; the data stored in the memory including original source verifying data defining a original source verifying image; said original source verifying image associated with an operation that may be performed in said machine; the data stored in the memory further including sameness criterion data indicating a criterion for use in obtaining data indicating whether two images are the same;

a storage medium access device for accessing a medium that stores data; and a processor connected for receiving data defining images from the image input circuitry; the processor further being connected for accessing data in the memory; the processor further being connected for receiving data from the storage medium access device; the article comprising:

a storage medium that can be accessed by the storage medium access device when the article is used in the system; and data stored by the storage medium so that the storage medium access device can provide the stored data to the processor when the article is used in the system; the stored data comprising instruction data indicating instructions the processor can execute; the processor in executing the instructions:

receiving image set data from the image input circuitry, the image set data defining an image set that shows a purported source verifying image;

using the image set data and the original source verifying data from memory to obtain similarity measure data; the similarity measure data indicating a measure of similarity between the original and purported source verifying images;

using the sameness criterion data and the similarity measure data to obtain sameness data indicating whether the original and purported source verifying images are the same; and performing said operation associated with the original source verifying image only if the sameness data indicate that the first and second source verifying images are the same.

12. A method of determining whether an operation may be performed based on whether two images are the same; comprising:

storing match criterion data, said match criterion data for use in determining whether two images are the same;

storing an original source verifying image in memory said original source verifying image associated with said operation;

receiving a purported source verifying image;

measuring the similarity between the original source verifying image and the purported source verifying image to obtain measured similarity data;

using the match criterion data and measured similarity data to determine whether the original source verifying image and the purported source verifying image are the same; and performing said operation only if the original source verifying image and the purported source verifying image are the same.

13. The method of claim 12 in which the act of storing an original source verifying image in memory comprises:

scanning a sheet of marking medium to obtain data defining a first image of the sheet; the sheet being a form that includes a field; the field including marks made by a human by hand; and using the data defining a first image of the sheet to obtain the original source verifying image; the original source verifying image comprising only the contents of the field; the act of receiving a purported source verifying image comprising:

scanning the sheet of marking medium to obtain data defining a second image of the sheet; and using the data defining a second image of the sheet to obtain purported source verifying image; the purported source verifying image comprising only the contents of the field.

14. The method of claim 13 in which the act of storing an original source verifying image in memory further comprises:

scanning a document to obtain data defining an image of a document; and storing the data defining an image of a document in memory; the act of performing the operation comprising:

using the data defining an image of a document to provide a version of the image of the document as output.

15. In a system capable of processing image data, a method for determining whether an operation can be carried out in said system, said method comprising the steps of:

a) storing match criterion data, said match criterion data for use in determining if two images are the same;

b) storing an original source verifying image, said original source verifying image associated with an operation that may be performed in said system;

c) said system receiving a purported source verifying image in a request to perform said operation;

d) said system comparing said original source verifying image with said purported source verifying image to obtain similarity measure data, said similarity measure data indicating a measure of similarity between said original source image and said purported source verifying image;

e) said system comparing said similarity measure data to said match criterion data to determine if said original source verifying image is the same as said purported source verifying image; and f) said system performing said operation associated with said original source verifying image only if said original source verifying image is the same as said purported source verifying image.

16. The method as recited in claim 15 wherein said match criterion data defines a threshold value.

17. The method of claim 15 in which the act of storing an original source verifying image comprises:

receiving an image set that shows the original source verifying image; and extracting the original source verifying image from the image set that shows the original source verifying image.

18. The method of claim 17 in which the original source verifying images includes marks made by hand.

19. The method of claim 18 in which the marks are made in a field of a form, the image set showing an image of the form; the original source verifying image being an image of the field.

20. The method of claim 15 in which the act of said system receiving a purported source verifying image comprises:

receiving an image set that shows the purported source verifying image; and extracting the purported source verifying image from the image set that shows the purported source verifying image.

21. The method of claim 20 in which the purported source verifying image is represented by pixel data indicating a value for each pixel of the purported source verifying image and the original source verifying image is represented by pixel data indicating a value for each pixel of the original source verifying image; the act of comparing said original source verifying image with said purported source verifying image comprising using the pixel data to compare values of pixels in the original and purported source verifying images to obtain the similarity measure data.

* * * * *